(12) United States Patent
Tsukada et al.

(10) Patent No.: US 7,261,172 B2
(45) Date of Patent: Aug. 28, 2007

(54) COOLING STRUCTURE OF ELECTRIC VEHICLE

(75) Inventors: Yoshiaki Tsukada, Saitama (JP); Takashi Ozeki, Saitama (JP); Mitsuo Nakagawa, Saitama (JP); Kyosuke Kitayama, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 111 days.

(21) Appl. No.: 11/168,402

(22) Filed: Jun. 29, 2005

(65) Prior Publication Data

US 2006/0027407 A1 Feb. 9, 2006

(30) Foreign Application Priority Data

Aug. 6, 2004 (JP) ............................ 2004-230497

(51) Int. Cl.
*B60K 11/00* (2006.01)
(52) U.S. Cl. ..................... 180/68.1; 180/65.1; 180/229
(58) Field of Classification Search ................ 180/68.1, 180/65.1, 229
See application file for complete search history.

(56) References Cited

U.S. PATENT DOCUMENTS

| | | | | |
|---|---|---|---|---|
| 2,581,072 A | * | 1/1952 | Brezek ...................... | 180/68.1 |
| 4,519,473 A | * | 5/1985 | Ochiai et al. ............... | 180/229 |
| 4,557,345 A | * | 12/1985 | Hamane et al. ............. | 180/229 |
| 4,577,720 A | * | 3/1986 | Hamane et al. ............. | 180/229 |
| 4,582,158 A | * | 4/1986 | Hamane ...................... | 180/229 |
| 4,606,422 A | * | 8/1986 | Jewett ....................... | 180/68.1 |
| 5,015,545 A | * | 5/1991 | Brooks ........................ | 429/99 |
| 5,477,936 A | * | 12/1995 | Sugioka et al. ............ | 180/68.5 |
| 5,577,747 A | * | 11/1996 | Ogawa et al. .............. | 180/220 |
| 5,657,830 A | * | 8/1997 | Kawashima et al. ........ | 180/220 |
| 6,655,483 B2 | * | 12/2003 | Hayashi ..................... | 180/65.1 |
| 6,662,891 B2 | * | 12/2003 | Misu et al. ................ | 180/68.1 |

FOREIGN PATENT DOCUMENTS

JP 11-255165 A 9/1999

* cited by examiner

*Primary Examiner*—Christopher Bottorff
(74) *Attorney, Agent, or Firm*—Birch, Stewart, Kolasch & Birch, LLP.

(57) ABSTRACT

To efficiently cool accessory equipment used in controlling an electric motor of an electric vehicle. A storage box and a vehicle body cover are provided under a seat for a rider to sit thereon. The storage box and the vehicle body cover are formed in such a way as to surround the storage box. Driver units for controlling an electric motor as a power source are provided between the storage box and the vehicle body cover. The vehicle body cover is provided with intake ports for guiding headwind as cooling air for the driver units into the vehicle body cover and exhaust ports for discharging the headwind guided in through the intake ports to outside of the vehicle body cover.

20 Claims, 4 Drawing Sheets

COOLING STRUCTURE OF ELECTRIC VEHICLE

CROSS-REFERENCE TO RELATED APPLICATIONS

This nonprovisional application claims priority under 35 U.S.C. § 119(a) on Patent Application No. 2004-230497, filed in Japan on Aug. 6, 2004, the entirety of which is incorporated herein by reference.

BACKGROUND OF THE INVENTION

1. Field of the Invention

The present invention relates to a cooling structure for cooling accessory equipment used in controlling an electric motor of an electric vehicle.

2. Description of Background Art

In Japanese Application No. 255165/1999, a technology has been disclosed whereby a control unit of a motorcycle uses an electric motor as a power source. The control unit executes electric motor current control, shift control, and so forth. The control unit is accommodated between a battery and a storage box, inside side covers of a vehicle body. This prevents the control unit from being exposed to rain water.

The control unit is a heating component, and as such, cooling thereof is required. However, a spot between the battery and the storage box inside the side covers, where the control unit is disposed, is airtight. In addition, heating components, such as the battery, battery charger, and so forth, are disposed around the control unit. Therefore, a deterioration in cooling efficiency of the control unit is likely to occur.

SUMMARY OF THE INVENTION

It is therefore an object of the invention to provide a cooling structure of an electric vehicle, capable of efficiently cooling accessory equipment for controlling an electric motor thereof.

To solve the problems described as above, a first aspect of the present invention provides a cooling structure of an electric vehicle (for example, a motorcycle 1 in an embodiment described later), wherein a storage box (for example, a storage box 9 in the embodiment described later) and a vehicle body cover (for example, a vehicle body cover 10 in the embodiment described later) surrounding all around the storage box are provided under a seat (for example, a seat 8 in the embodiment described later) for a rider to sit thereon, accessory equipment (for example, a driver unit 30 in the embodiment described later) for controlling an electric motor as a power source is provided between the storage box and the vehicle body cover, and the vehicle body cover is provided with intake ports (for example, intake ports 15 in the embodiment described later) for guiding headwind, as cooling air for the accessory equipment, into the vehicle body cover, and exhaust ports (for example, exhaust ports 16 in the embodiment described later) for discharging the headwind guided in through the intake ports to outside of the vehicle body cover.

With adoption of the above-described structure, the accessory equipment is disposed between the storage box and the vehicle body cover. Therefore, space under the seat, which has been a dead space in the past, can be effectively utilized. Furthermore, the accessory equipment can be cooled by the headwind guiding into the vehicle body cover through the intake ports, and the headwind after cooling can be discharged to an outside of the vehicle body cover through the exhaust ports.

A second aspect of the present invention provides a cooling structure of the electric vehicle, wherein the vehicle body cover has bulged parts (for example, side cover parts 14 in the embodiment described later) protruding from the seat to sideward of a vehicle body, the accessory equipment is disposed in the respective bulged parts, and respective front parts (for example, front faces 14a in the embodiment described later) of the bulged parts are provided with the intake port while respective rear parts (for example, rear faces 14b in the embodiment described later) thereof are provided with the exhaust port.

With adoption of the above-described structure, the headwind can be guided into the vehicle body cover through the intake ports with greater ease, and the headwind guided therein is caused to pass around the accessory equipment to be subsequently discharged through the exhaust ports with greater ease.

A third aspect of the present invention provides a cooling structure of the electric vehicle, wherein the intake ports, and the exhaust ports are open in the downward direction.

With adoption of the above-described structure, the rain water, and so forth are not prone to enter the vehicle body cover through the intake ports, and the exhaust ports. That is, it is possible to both cool and waterproof the accessory equipment.

A fourth aspect of the present invention provides a cooling structure of an electric vehicle (for example, the motorcycle 1 in the embodiment described later), wherein a storage box (for example, the storage box 9 in the embodiment described later), and a vehicle body cover (for example, the vehicle body cover 10 in the embodiment described later) surrounding the storage box are installed under a seat (for example, the seat 8 in the embodiment described later) for a rider to sit thereon, the vehicle body cover comprises a rear undercover part (for example, a rear undercover part 13 in the embodiment described later) covering a rear side lower part of the storage box, the rear undercover part including a face curving upward following advancement toward the rear side of the vehicle body, and the vehicle body cover has exhaust ports for air (for example, exhaust ports 17 in the embodiment described later), provided in the rear undercover part, while the vehicle body cover is provided with intake ports (for example, intake ports 15 in the embodiment described later) for guiding air therein in addition to the exhaust ports, accessory equipment (for example, ECU 18 in the embodiment described later) for controlling an electric motor, as a power source, being installed in the vicinity of the exhaust ports, and between the rear undercover part and the storage box.

With adoption of the above-described structure, the accessory equipment is disposed between the rear undercover part, and the storage box. Therefore, space under the seat, which has been a dead space in the past, can be effectively utilized. Furthermore, it is possible to cause suction pressure to occur in the vicinity of the exhaust ports due to the effect of air flowing around the vehicle body cover. Consequently, air inside the vehicle body cover can be sucked to the outside, so that the air guided in through the intake ports can be actively guided toward the exhaust ports. Furthermore, the accessory equipment disposed in the vicinity of the exhaust ports can be cooled by the air guided in the vehicle body cover before discharging the air after cooling to an outside of the vehicle body cover through the exhaust ports.

A fifth aspect of the present invention provides a cooling structure of the electric vehicle, wherein a license plate fixture part (for example, a license plate fixture part 20 in the embodiment described later) is installed above, and rearward of the exhaust ports.

With adoption of the above-described structure, it is possible to prevent the license plate fixture part from disturbing the flow of air, in the vicinity of the exhaust ports. Therefore, the effect of sucking out air from the exhaust ports due to suction pressure can be enhanced.

A sixth aspect of the present invention provides a cooling structure of the electric vehicle, further comprising a rear fender (for example, a rear fender 19 in the embodiment described later) covering at least an upper part of a rear wheel, wherein the exhaust ports are provided at positions opposite to the top face of the rear fender.

With adoption of the above-described structure, rain water, dust, and so forth, gathered up by the rear wheel can be prevented from making ingress into the interior of the rear undercover part through the exhaust ports. That is, it is possible to both cool and waterproof the accessory equipment. Furthermore, the headwind flowing around the rear wheel can be rectified by the rear fender, so that a high suction pressure can be caused to occur in a region surrounded by the rear undercover part and the rear fender, thereby enabling the effect of sucking out air from the exhaust ports due to the suction pressure to be further enhanced.

According to the first aspect of the present invention, the space under the seat can be effectively utilized, and an excellent effect can be exhibited in that the accessory equipment can be actively and sufficiently cooled by the headwind guided into the vehicle body cover through the intake ports.

According to the second aspect of the present invention, a massive volume of the headwind can be guided into the vehicle body cover to thereby cool the accessory equipment, exhibiting an excellent effect in that cooling efficiency for the accessory equipment can be enhanced.

According to the third aspect of the present invention, it is possible to render the rain water, and so forth not prone to enter the vehicle body cover through the intake ports and the exhaust ports. Therefore, the accessory equipment can be protected from the rain water, and so forth, so that both cooling and waterproofing of the accessory equipment can be secured.

According to the fourth aspect of the present invention, the space under the seat can be effectively utilized. Further, it is possible to actively guide the air guided in the vehicle body cover through the intake ports toward the exhaust ports by sucking out the air from the exhaust ports due to the suction pressure, thereby exhibiting an excellent effect in that the accessory equipment disposed in the vicinity of the exhaust ports can be actively and efficiently cooled by the air guided in the vehicle body cover through the intake ports.

According to the fifth aspect of the present invention, the effect of sucking out air from the exhaust ports due to suction pressure can be enhanced. Therefore, the accessory equipment can be further efficiently cooled.

According to the sixth aspect of the present invention, the rain water, dust, and so forth, gathered up by the rear wheel can be prevented from making ingress into the interior of the rear undercover part through the exhaust ports. Therefore, the accessory equipment can be protected from the rain water, dust, and so forth, so that both cooling and waterproofing of the accessory equipment can be secured. Furthermore, the effect of sucking out air from the exhaust ports due to suction pressure can be further enhanced. Therefore, flow of the air from the intake ports to the exhaust ports is further promoted, thereby enabling the accessory equipment to be further efficiently cooled.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

One embodiment of a cooling structure of an electric vehicle, according to the invention, will be described hereinafter with reference to the accompanying drawings. The embodiment described hereinafter is applied to a motorcycle; however, it should be understood that the present invention can be applied to other vehicles as well.

Figure 1:
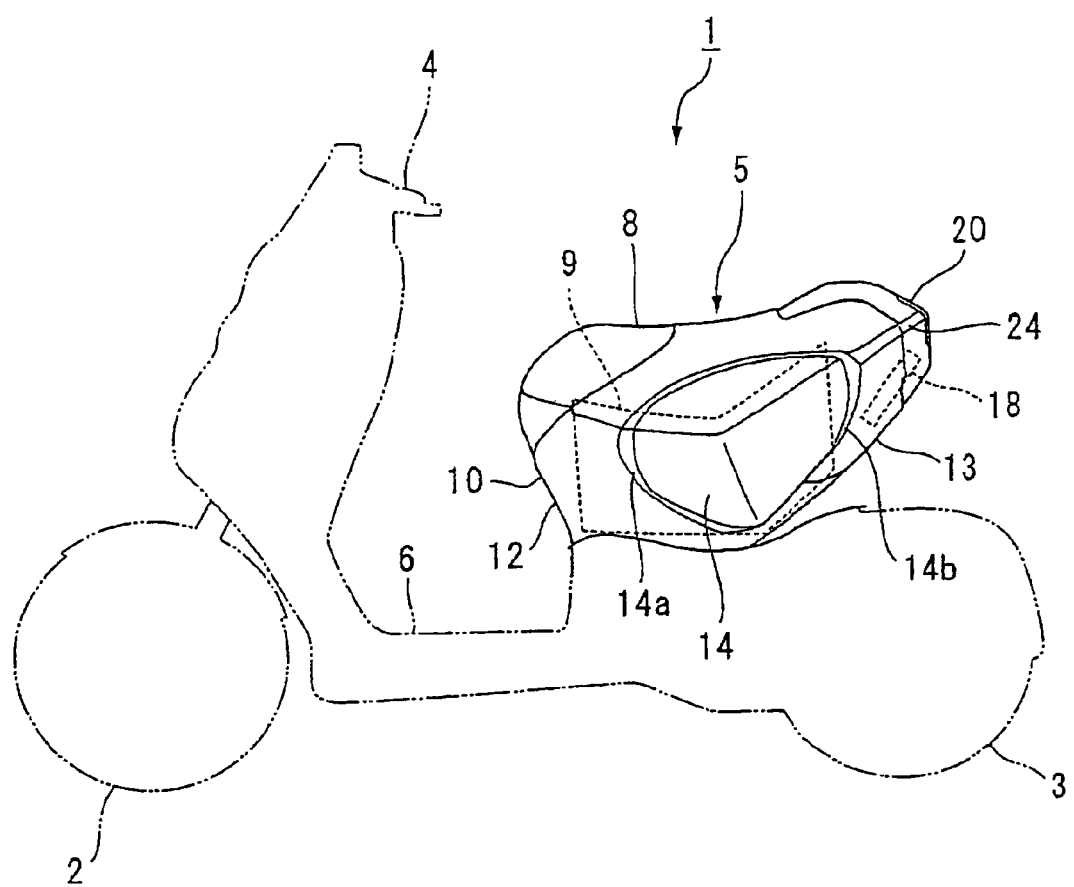
FIG. 1 is a schematic side view broadly showing a motorcycle (an electric vehicle) provided with a cooling structure according to the invention.

As shown in FIG. 1, a motorcycle (an electric vehicle) 1 according the present embodiment has a handlebar 4 for steering a front wheel 2. A seat unit 5 is installed slightly in front of and above a rear wheel 3 which is a driving wheel. A step floor (feet-rest part) 6 is disposed between the front wheel 2 and the seat unit 5. The motorcycle 1 is a hybrid motorcycle having a combustion engine and an electric motor (neither thereof, shown in the figure) that are capable of driving the rear wheel 3 by use of either or both of the combustion engine and the electric motor.

The seat unit 5 has a seat 8 for a rider to sit thereon, and a storage box 9 capable of storing a helmet, and so forth therein is provided under the seat 8. A vehicle body cover 10 is provided in such a way as to surround all around the storage box 9.

The vehicle body cover 10 comprises a front undercover part 12 covering a front side lower part of the storage box 9, a rear undercover part 13 covering a rear side lower part of the storage box 9, and side cover parts (bulged parts) 14, 14 on the right and the left, covering the right side and left side of the storage box 9, respectively. The rider of the motorcycle sits on the seat 8 and drives with the feet of the rider resting on the step floor 6.

Figure 3:
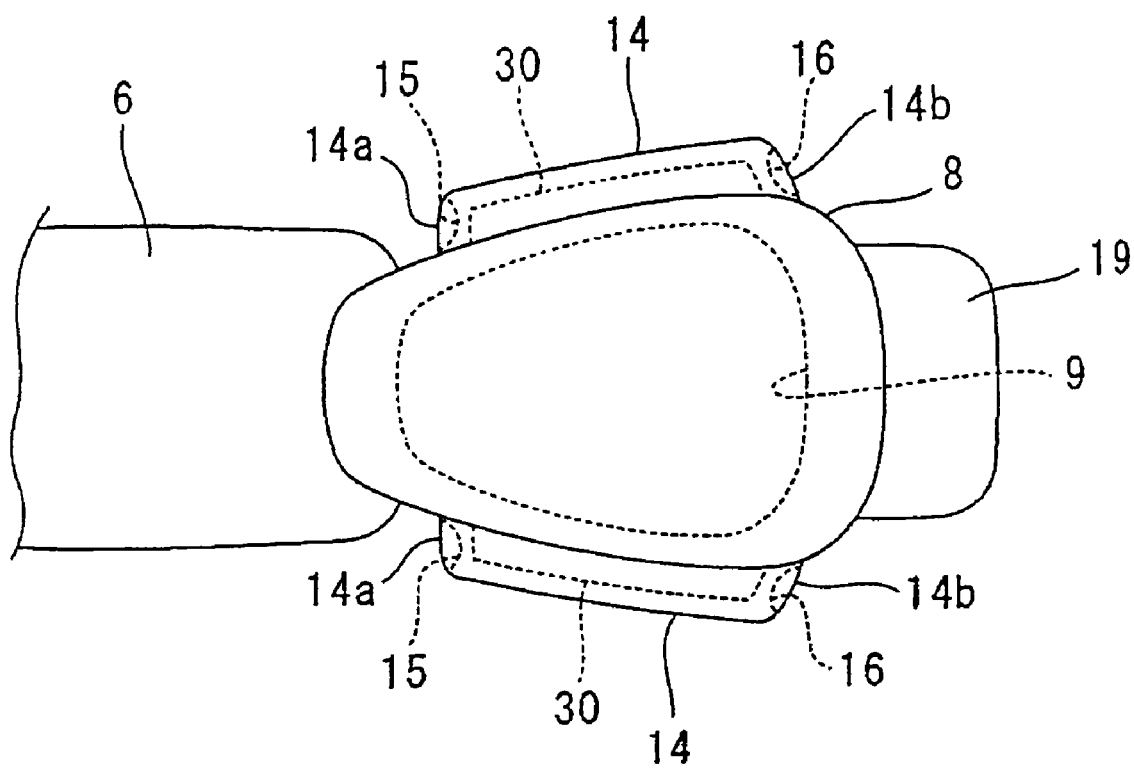
FIG. 3 is a plan view broadly showing a rear part of the motorcycle.
Figure 4:
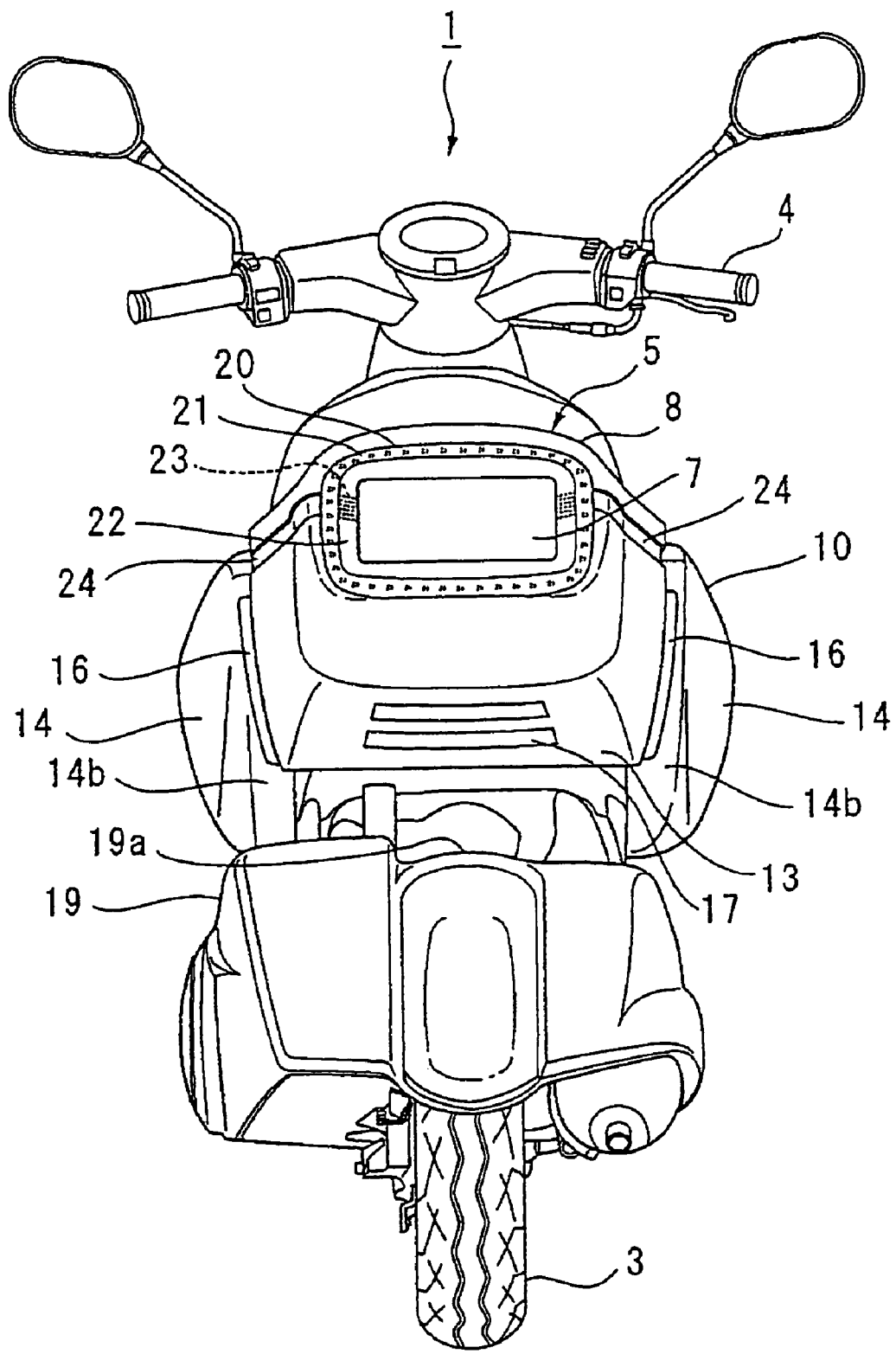
FIG. 4 is a rear elevation broadly showing the motorcycle.

As shown in a plan view of FIG. 3, neither the front undercover part 12, nor the rear undercover part 13 protrudes from the seat 8 to sidewards of the vehicle body. However, both the side cover parts 14, 14 on the right and the left bulge from the seat 8 sidewards of the vehicle body.

Figure 2:
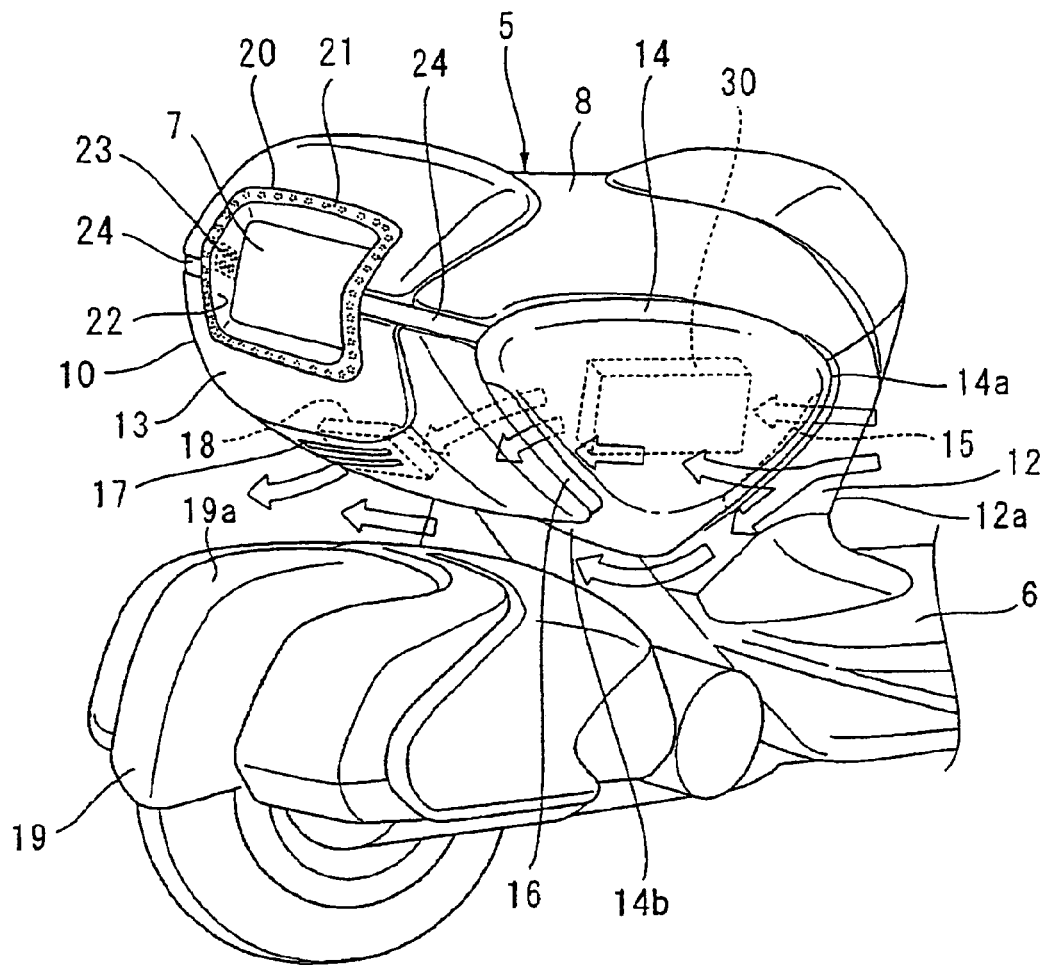
FIG. 2 is a perspective view broadly showing the motorcycle in FIG. 1, as diagonally seen from the rear side thereof.

The side cover parts 14, 14 on the right and the left are substantially identical in structure, and are each substantially in the shape of an inverted triangle in side view as shown in FIGS. 1, and 2. Respective front faces (front part) thereof 14a, 14a are each formed so as to have a face receding backward of the vehicle body while falling downward. Respective rear faces (rear part) thereof 14b, 14b are each formed so as to have a face advancing forward of the vehicle body while falling downward. The back end of the front 14a is joined with the frond end of the rear face 14b through the intermediary of a smooth curvilinear face.

When driving, headwind strikes the respective front faces 14a, 14a of the side cover parts 14, 14 that bulge sidewards of the vehicle body as described above. The respective front faces 14a, 14a are provided with an intake port 15 for guiding the headwind (that is, air) into the side cover parts 14, 14 on the right and the left, respectively. The respective rear faces 14b, 14b are provided with an exhaust port 16 for discharging the headwind in the side cover parts 14, 14 on the right and the left to an outside thereof, respectively. The intake ports 15 and the exhaust ports 16 open in the downward direction.

A driver unit 30 for controlling the electric motor is disposed between the intake ports 15 and the exhaust ports 16, respectively, in a space between the storage box 9 and the respective side cover parts 14, 14. The driver unit 30 incorporates an inverter, converting DC current from a storage battery (not shown) into AC current to be supplied to the electric motor, which is driven as a motor, and converting AC current obtained when the electric motor is driven as a generator into DC current to be stored in the storage battery.

As a result of disposing the intake ports 15, the exhaust ports 16, and the driver unit 30 as described above, the headwind guided into the respective side cover parts 14, 14 through each of the intake ports 15 passes around the driver unit 30 to be subsequently discharged through the respectively exhaust ports 16. Accordingly, the driver unit 30 is air-cooled by the headwind guided into the vehicle body cover 10.

The front undercover part 12 is formed so as to expand sidewards of the vehicle body following advancement from the front edge 12a situated at the center of the vehicle body, in the width direction thereof, toward the rear side of the vehicle body, to be butted against the respective front faces 14a, 14a of the side cover parts 14, 14.

The rear undercover part 13 is formed so as to be smoothly continuous with the respective rear faces 14b, 14b of the side cover parts 14, 14, including a face curving upward following advances toward the rear side of the vehicle body.

Plural exhaust ports 17 each in the form of a slit extending in the direction of width of the vehicle body are provided in a region of the rear undercover part 13. The exhaust ports 17 are situated above the rear wheel 3 and open downward. Furthermore, an electronic control unit (ECU) 18 for controlling the driver unit 30 is disposed in the vicinity of the exhaust ports 17 in a space between the rear undercover part 13 and the storage box 9. That is, the electric motor is controlled by the ECU 18 through the intermediary of the driver unit 30 according to a driving condition of the vehicle such as an accelerator opening, and so forth. With the present embodiment, the driver unit 30 and the ECU 18 constitute the accessory equipment for controlling the electric motor as the power source.

The space between the rear undercover part 13 and the storage box 9 communicates with the space between the storage box 9 and the respective side cover parts 14, 14. Part of the headwind guided in through the respective intake ports 15 of the side cover parts 14, 14 flows into the space between the rear undercover part 13 and the storage box 9 to be thereby distributed around the ECU 18 before being discharged to the outside through the exhaust ports 17 of the rear undercover part 13.

As shown in FIGS. 2 and 3, a license plate fixture part 20 is provided at a joint between the seat 8 and the rear undercover part 13 behind the seat unit 5. The license plate fixture part 20 is positioned further rearward of the vehicle body than the exhaust ports 17 of the rear undercover part 13 and is made up of a license plate 7 and a tail light 21 provided around the license plate 7.

The tail light 21 is disposed so as to surround the outer periphery of the license plate 7 substantially rectangular in shape. A recess 22 depressed toward the front of the vehicle body is formed inside of the tail light 21. The license plate 7 is fixed to the bottom of the recess 22. Furthermore, a license light 23 for illuminating the license plate 7 is installed on both the right and left sides of the license plate 7, respectively.

Furthermore, a pair of right-side and left-side rear blinker lights or turn signal lights 24, 24 are installed on both the right-side and left-side of the tail light 21, respectively, and adjacent thereto at the joint between the seat 8 and the rear undercover part 13. The rear blinker lights 24, 24 each are structured so as to expand sidewards of the vehicle body toward the front, the respective front extremities thereof being butted against the respective side cover parts 14, 14.

A rear fender 19 in a predetermined shape covering an upper part of the rear wheel 3 and sides of half the upper part thereof is installed below the rear undercover part 13. The rear fender 19 also covers a drive mechanism such as the electric motor as the power source, the combustion engine, transmission, clutch (neither thereof, shown in the figure), and so forth.

More specifically, the exhaust ports 17 of the rear undercover part 13 are provided at positions opposite to the top face 19a of the rear fender 19. As a result, rain water, dust, and so forth, gathered up by the rear wheel 3, can be prevented from making ingress into the interior of the rear undercover part 13 directly through the exhaust ports 17, thereby protecting the ECU 18 from rain water, and dust. With the present embodiment, in particular, the rear fender 19 covers the upper part of the rear wheel 3 and the sides of half the upper part thereof. Therefore, prevention of the ingress of rain water, and so forth through the exhaust ports 17 can be implemented with reliability.

Furthermore, the rear fender 19 covers the upper part of the rear wheel 3, and the sides of half the upper part thereof. Therefore, rain water, dust, and so forth gathered up by the rear wheel 3 can be prevented from making ingress into the interior of the respective side cover parts 14, 14 through the respective exhaust ports 16 of the side cover parts 14, 14, thereby protecting the driver unit 30 from the rain water, and dust.

With the motorcycle 1 built as above, the driver unit 30 is disposed between the storage box 9, and the respective cover parts 14, 14, and the ECU 18 is disposed between the storage box 9 and the rear undercover part 13, so that space under the seat 8, which has been a dead space in the past, can be effectively utilized.

The respective side cover parts 14, 14 of the vehicle body cover bulge sidewards of the vehicle body. The respective front faces thereof 14a, 14a struck by the headwind are provided with the intake port 15. The respective rear faces thereof 14b, 14b are provided with the exhaust port 16. therefore, it is possible to guide the headwind into respective side cover parts 14, 14 smoothly, and in massive volume, and to smoothly discharge part of the headwind guided therein from the respective exhaust ports 16. Since the driver unit 30 is disposed between the respective intake ports 15, and the respective exhaust ports 16 of the side cover parts 14, 14, on the right and the left, respectively, part of the headwind guided in through respective intake ports 15 passes around the driver unit 30 to subsequently flow toward the respectively exhaust ports 16. As a result, the driver unit 30 can be actively and sufficiently air-cooled, thereby considerably enhancing cooling efficiency for the driver unit 30.

Furthermore, the respective intake ports 15 as well as the respective exhaust ports 16 of the side cover parts 14, 14 on the right and the left, respectively, are open downward. Therefore, rain water, and so forth are not prone to enter the respective side cover parts 14, 14 through the respective intake ports 15 and the respective exhaust ports 16, so that the driver unit 30 can be protected from the rain water, and so forth. That is, it is possible to secure both cooling and waterproofing of the driver unit 30.

Furthermore, the headwind flowing along the outer periphery of the front undercover part 12 is herded downward by guidance of the respective front faces 14a, 14a of the side cover parts 14, 14 to thereby form a flow moving from the back ends of the respective front faces 14a, 14a along the respective rear faces 14b, 14b to further form a flow moving along an underside face of the rear undercover part 13, curving upward, thereby passing between the underside face of the rear undercover part 13, and the rear fender 19 before flowing away backward of the vehicle body. Furthermore, the headwind flowing along the outer peripheries of the respective side cover parts 14, 14 turns from the outer peripheries thereof toward the outer periphery of the rear undercover part 13 to thereby form a flow moving along the underside face of the rear undercover part 13, curving upward, thereby passing between the underside face of the rear undercover part 13, and the rear fender 19 before flowing away backward of the vehicle body. At this point in time, suction pressure occurs in the vicinity of the exhaust ports 17 due to the effect of air (the headwind) flowing along the rear undercover part 13, thereby sucking out air inside the rear undercover part 13 to the outside. As a result, the headwind guided in through the respective intake ports 15 can be actively guided toward the exhaust ports 17 of the rear undercover part 13, thereby increasing a volume of the headwind flowing from the respective intake ports 15 toward the respective exhaust ports 16. Since the ECU 18 is disposed in the vicinity of the exhaust ports 17, part of the headwind guided in through respective intake ports 15 passes around the ECU 18 to subsequently flow toward the exhaust ports 17. As a result, the ECU 18 can be actively and sufficiently air-cooled, thereby considerably enhancing cooling efficiency of the ECU 18.

With the present embodiment, in particular, the license plate fixture part 20 is disposed above the exhaust ports 17 and on the rear side of the vehicle body. Therefore, there is no possibility that the license plate fixture part 20 disturbs the flow of air in the vicinity of the exhaust ports 17, thereby reducing the occurrence of the suction pressure in the vicinity of the exhaust ports 17. Consequently, it is possible to enhance the effect of sucking out air from the exhaust ports 17 due to the suction pressure, thereby enabling the ECU 18 to be further efficiently cooled.

Furthermore, with the present embodiment, the headwind flowing around the rear wheel 3 can be rectified by the rear fender 19, so that a high suction pressure can be caused to occur in a region surrounded by the rear undercover part 13, and the rear fender 19, that is, in the vicinity of the exhaust ports 17, thereby enabling the effect of sucking out air from the exhaust ports 17 due to the suction pressure to be further enhanced. Accordingly, the ECU 18 can be further efficiently cooled.

Still further, as described hereinbefore, the rain water, dust, and so forth, gathered up by the rear wheel 3 can be prevented from making ingress into the interior of the rear undercover part 13 through the exhaust ports 17 due to the presence of the rear fender 19. Therefore, the ECU 18 can be protected from the rain water, and dust, so that it is possible to both cool and waterproof the ECU 18.

The invention is not limited in scope to the embodiment described in the foregoing. For example, the electric vehicle is not limited to a hybrid motorcycle according to the present embodiment, and may be a motorcycle having only an electric motor as a power source. Furthermore, the electric vehicle is not limited to a motorcycle, the invention is applicable to a three-wheeled vehicle or a saddle-ride type four-wheeled vehicle.

With the embodiment described in the foregoing, the driver unit as the accessory equipment is installed in the side cover parts 14, 14 on the right and the left, respectively. However, the accessory equipment may be installed in only one of the side cover parts 14, 14 on the right and the left, respectively, and no accessory equipment may be installed in the other of the side cover parts 14, 14. Otherwise, the driver unit may be installed in one of the side cover parts 14, 14 while the ECU may be installed in the other of the side cover parts 14, 14.

Furthermore, the accessory equipment is not limited to a driver unit and the ECU, but may be any heating component requiring cooling.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cooling structure for an electric vehicle, comprising:
    a storage box;
    a vehicle body cover, said vehicle body cover surrounding the storage box, said storage box and said vehicle body cover being installed under a seat for a rider to sit thereon; and
    accessory equipment for controlling an electric motor as a power source of the electric vehicle, said accessory equipment being installed between the storage box and the vehicle body cover,
    wherein the vehicle body cover is provided with bulged parts that protrude from the seat sideward of a body of the electric vehicle, the bulged parts including intake ports and exhaust ports formed therein, and at least some of the accessory equipment is located in the bulged parts, the intake ports guiding headwind as cooling air for the accessory equipment into the vehicle body cover and the exhaust ports discharging the headwind guided in through the intake ports to an outside of the vehicle body cover.

2. The cooling structure for an electric vehicle according to claim 1, wherein respective front parts of the bulged parts are provided with the intake ports while respective rear parts thereof are provided with the exhaust ports.

3. The cooling structure for an electric vehicle according to claim 1, wherein the intake ports and the exhaust ports open in the downward direction.

4. The cooling structure for an electric vehicle according to claim 2, wherein the intake ports and the exhaust ports open in the downward direction.

5. The cooling structure for an electric vehicle according to claim 1, wherein said accessory equipment is a driver unit, said driver unit including an inverter that converts DC current into AC current when the electric motor is used as the power source of the electric vehicle and converts AC current into DC current when the electric motor is used as a generator.

6. The cooling structure for an electric vehicle according to claim 2, wherein said accessory equipment is a driver unit, said driver unit including an inverter that converts DC current into AC current when the electric motor is used as the power source of the electric vehicle and converts AC current into DC current when the electric motor is used as a generator.

7. A cooling structure for an electric vehicle, comprising:
a storage box;
a vehicle body cover surrounding the storage box, the storage box and vehicle body cover being installed under a seat for a rider to sit thereon, the vehicle body cover comprising:
a rear undercover part covering a rear side lower part of the storage box, the rear undercover part including a face curving upward following advancement toward the rear side of the vehicle body;
bulged parts protruding from the seat sideward of the vehicle body;
exhaust ports for air provided in the rear undercover part; and
intake ports for guiding air into the vehicle body cover formed in the bulged parts; and
accessory equipment for controlling an electric motor as a power source of the electric vehicle, at least some of said accessory equipment being installed in the vicinity of the exhaust ports and between the rear undercover part and the storage box, and at least some of the accessory equipment being installed in the bulged parts.

8. The cooling structure for an electric vehicle according to claim 7, wherein a license plate fixture part is installed above and rearward of the exhaust ports.

9. The cooling structure for an electric vehicle according to claim 7, further comprising a rear fender covering at least an upper part of a rear wheel of the electric vehicle,
wherein the exhaust ports are provided at positions opposite to the top face of the rear fender.

10. The cooling structure for an electric vehicle according to claim 8, further comprising a rear fender covering at least an upper part of a rear wheel of the electric vehicle,
wherein the exhaust ports are provided at positions opposite to the top face of the rear fender.

11. The cooling structure for an electric vehicle according to claim 7, wherein said accessory equipment is a driver unit, said driver unit including an inverter that converts DC current into AC current when the electric motor is used as the power source of the electric vehicle and converts AC current into DC current when the electric motor is used as a generator.

12. The cooling structure for an electric vehicle according to claim 8, wherein said accessory equipment is a driver unit, said driver unit including an inverter that converts DC current into AC current when the electric motor is used as the power source of the electric vehicle and converts AC current into DC current when the electric motor is used as a generator.

13. A cooling structure for an electric vehicle, comprising:
a storage box;
a vehicle body cover covering the storage box; and
accessory equipment including a driver unit for controlling an electric motor of the electric vehicle, said driver unit being installed between the storage box and the vehicle body cover,
wherein the vehicle body cover is provided with bulged parts that protrude from the seat sideward of a body of the electric vehicle, the bulged parts including intake ports and exhaust ports formed therein, and the driver unit is located in the bulged parts, the intake ports guiding cooling air into the vehicle body cover to cool the driver unit and the exhaust ports discharging the cooling air guided in through the intake ports to an outside of the vehicle body cover.

14. The cooling structure for an electric vehicle according to claim 13, wherein respective front parts of the bulged parts are provided with the intake ports while respective rear parts thereof are provided with the exhaust ports.

15. The cooling structure for an electric vehicle according to claim 13, wherein the intake ports and the exhaust ports open in the downward direction.

16. The cooling structure of an electric vehicle according to claim 13, wherein the vehicle body cover comprises a rear undercover part covering a rear side lower part of the storage box, the rear undercover part including a face curving upward following advancement toward the rear side of the vehicle body, exhaust ports are provided in the rear undercover part, and at least a portion of said accessory equipment is installed in the vicinity of the exhaust ports formed in the rear undercover part and between the rear undercover part and the storage box.

17. The cooling structure for an electric vehicle according to claim 16, wherein a license plate fixture part is installed above and rearward of the exhaust ports.

18. The cooling structure for an electric vehicle according to claim 16, further comprising a rear fender covering at least an upper part of a rear wheel of the electric vehicle,
wherein the exhaust ports formed in the rear undercover part are provided at positions opposite to the top face of the rear fender.

19. The cooling structure according to claim 13, wherein said driver unit includes an inverter that converts DC current into AC current when the electric motor is used as a power source of the electric vehicle and converts AC current into DC current when the electric motor is used as a generator.

20. A cooling structure for an electric vehicle, comprising:
a storage box;
a vehicle body cover covering the storage box; and
a driver unit for controlling an electric motor of the electric vehicle, said driver unit being installed between the storage box and the vehicle body cover, said driver unit including an inverter that converts DC current into AC current when the electric motor is used as a power source of the electric vehicle and converts AC current into DC current when the electric motor is used as a generator,
wherein the vehicle body cover is provided with intake ports and exhaust ports, the intake ports guiding cooling air into the vehicle body cover to cool the driver unit and the exhaust ports discharging the cooling air guided in through the intake ports to an outside of the vehicle body cover.

* * * * *